(12) United States Patent
Theobald (10) Patent No.: US 9,367,553 B2
(45) Date of Patent: Jun. 14, 2016

(54) COMPUTER FILE SYSTEM TRAVERSAL

(75) Inventor: Dietmar C. Theobald, Karlsruhe (DE)

(73) Assignee: SAP SE, Walldorf (DE)

( * ) Notice: Subject to any disclaimer, the term of this patent is extended or adjusted under 35 U.S.C. 154(b) by 2375 days.

(21) Appl. No.: 11/648,065

(22) Filed: Dec. 30, 2006

(65) Prior Publication Data

US 2008/0162511 A1 Jul. 3, 2008

(51) Int. Cl.
*G06F 7/00* (2006.01)
*G06F 17/30* (2006.01)

(52) U.S. Cl.
CPC .... *G06F 17/30106* (2013.01); *G06F 17/30091* (2013.01)

(58) Field of Classification Search
USPC ...................................................... 707/3, 101
See application file for complete search history.

(56) References Cited

U.S. PATENT DOCUMENTS

| | | | | |
|---|---|---|---|---|
| 4,763,277 | A * | 8/1988 | Ashford | G06N 5/04 706/47 |
| 5,276,874 | A * | 1/1994 | Thomson | |
| 5,829,004 | A * | 10/1998 | Au | 711/173 |
| 6,286,002 | B1 * | 9/2001 | Axaopoulos | G06F 17/30864 705/26.8 |
| 6,356,902 | B1 | 3/2002 | Tan et al. | |
| 6,356,946 | B1 | 3/2002 | Clegg et al. | |
| 6,567,815 | B1 * | 5/2003 | Rubin et al. | |
| 6,694,323 | B2 * | 2/2004 | Bumbulis | |
| 6,856,993 | B1 * | 2/2005 | Verma et al. | |
| 2002/0073068 | A1 * | 6/2002 | Guha | 707/1 |
| 2004/0093329 | A1 * | 5/2004 | Von Bergen et al. | 707/3 |
| 2004/0249805 | A1 * | 12/2004 | Chuvilskiy | 707/3 |
| 2004/0267732 | A1 * | 12/2004 | Luk et al. | 707/3 |
| 2005/0033740 | A1 * | 2/2005 | Cao et al. | 707/3 |
| 2005/0050011 | A1 * | 3/2005 | Van Der Linden et al. | 707/3 |
| 2005/0050059 | A1 * | 3/2005 | Van Der Linden | G06F 17/30917 |
| 2005/0131867 | A1 * | 6/2005 | Wilson | 707/3 |
| 2005/0216445 | A1 * | 9/2005 | Rao | 707/3 |
| 2006/0143202 | A1 * | 6/2006 | Parker | 707/101 |
| 2006/0195427 | A1 * | 8/2006 | Kilroy | 707/3 |
| 2006/0224606 | A1 * | 10/2006 | Sedky et al. | 707/101 |
| 2006/0236224 | A1 * | 10/2006 | Kuznetsov | G06F 17/227 715/235 |

OTHER PUBLICATIONS

Jonathan M. Smith; Rapid Location of mount points; 1989; pp. 1-13.*
Binary Tree Traversal Methods; Apr. 28, 2006; http://www.cise.ufl.edu/~sahni/cop3530/slides/lec216.pdf. pp. 1-5.*
Hierarchical Visitor Pattern; 2003; pp. 1-11.*
"A Program Annotation Facility for the Java Programming Language", *JSR-175 Public Draft Specifiation*, (2002-2003),1-34.

(Continued)

*Primary Examiner* — Mariela Reyes
*Assistant Examiner* — Jermaine Mincey
(74) *Attorney, Agent, or Firm* — Schwegman Lundberg & Woessner, P.A.

(57) ABSTRACT

A method and apparatus for computer file system traversal. An embodiment of a method includes receiving a set of data. The set of data has a hierarchical file structure, and the set of data includes multiple data elements. The set of data is traversed, where traversing the set of data elements includes determining whether to skip or process each data element that is addressed in the set of data. A serial data stream representing selected data elements of the set of data is output.

21 Claims, 8 Drawing Sheets

(56) References Cited

OTHER PUBLICATIONS

"Getting Started with the Annotation Processing Tool (apt)", http://java.sun.com/j2se/1.5.0/docs/guide/apt/GettingStarted.html, (2004),1-8.

"Package—Java 2 Platform Standard Edition Version 1.4.2", http://java.sun.com/j2se/1.4.2/docs/api/java/io/package-summary.html, (2003),1-6.

Gosling, James, et al., "The Java Language Specification Third Edition", *Addison Wesley-*, (May 2005),259-286 & 356-358.

"A Program Annotation Facility for the Java Programming language", *JSR-175 Public Draft Specification*, (2002-2003), 34 pgs.

"Getting Started with Annotation Processing Toll (pt)", *Java*, [online]. retrived from the internet:<URL: http://java.sun.com/j2se/1.5.0/docs/guide/apt/GettingStarted.html> (2004), (Apr. 6, 2007), 8 pages.

"Package—Java.2 Platform Standard Edition Version 1.4.2", [online] retrieved from the internet: <URL: http://java.sun.com/j2se/1.4.2/docs/api/java/io/package-summary.html> (2003), (2003), 6 pgs.

\* cited by examiner

COMPUTER FILE SYSTEM TRAVERSAL

TECHNICAL FIELD

Embodiments of the invention generally relate to the field of computer systems and, more particularly, to a method and apparatus for computer file system traversal.

BACKGROUND

In computer operations, a file structure may commonly be in the form of a hierarchical structure. In common terms, the file structure may be in the form of a tree structure in which there are multiple branches, with each branch possibly leading to another branch or to a leaf node.

In a particular example, a structure may be provided for Java™ class files or similar formats. In such a structure, the intermediary nodes are folders, with the leaf nodes being file entries.

The hierarchical structure is useful and sufficient in most cases. However, there may be instances in which it is necessary or useful to evaluate the hierarchical structure as a stream of data, rather than as a hierarchy. In one example, a serial process may be in place for evaluation of the data within the hierarchical structure to locate certain element.

In a complex structure, the conversion of a hierarchical structure into a data stream for processing may be time consuming or complicated in implementation. If the process of for working through the hierarchy of the file system is not efficient, then the serial processing that is based upon the conversion will be slowed in operation, which may create serious system performance issues for the ultimate processing functions.

SUMMARY OF THE INVENTION

A method and apparatus are provided for computer file system traversal.

In one aspect of the invention, a method includes receiving a set of data that has a hierarchical file structure, with the set of data having multiple data elements. The set of data is traversed, where traversing the set of data elements includes determining whether to skip or process each data element that is addressed in the set of data. A serial data stream representing selected data elements of the set of data is output.

In a second aspect of the invention, a file traversal system includes a walker module to traverse a hierarchical file structure, the file structure including a plurality of nodes; a handler module to determine whether to process or skip each node of the file structure; and a file classification module to classify the nodes of the file structure.

BRIEF DESCRIPTION OF THE DRAWINGS

Embodiments of the invention are illustrated by way of example, and not by way of limitation, in the figures of the accompanying drawings in which like reference numeral refer to similar elements.

DETAILED DESCRIPTION

Embodiments of the invention are generally directed to computer file system traversal.

As used herein:

"Traversal" means a process for progressing through the elements of a file system.

In an embodiment of the invention, an efficient file traversal process is process is provided for a hierarchical file structure. In an embodiment, the file traversal converts the file data into a serial data stream. In an embodiment, the file traversal walks through the hierarchical data structure in a single pass, with each element being processed no more than once. In an embodiment, the traversal is conducted without any need for looking ahead in the file structure. The resulting data stream may be provided to a module for processing.

In an embodiment of the invention, a file traversal process may be included within a set of tools to search files. In an embodiment, the traversal may be a part of a combined processing pipeline for file navigation, including the file system traversal, and file processing, including class file data extraction.

In an embodiment of the invention, a generic file structure concept is imposed on files to allow uniform processing. In an embodiment, processing of a file structure is provided in a single pass, without processing any element more than once. The traversal process provides basic filtering and decision making without looking forward in the file structure. In an embodiment, the traversal operates on a hierarchical data structure with named nodes such that decision making can be based upon the node names. Leaf nodes are file entries, and intermediary nodes are folders.

In an embodiment, an initial step involves the determination whether a set of data elements is in the form of a file system. If not, as in, for example, if the file system is in the form of an archive, the set of data elements may directed to other processing. If the data elements are in the form of a file system, the file system traversal may proceed. In an embodiment of the invention, the output of a file traversal is one or more classes of interests, or all classes contained within the file structure.

In an embodiment of the invention, the file traversal will examine each node that is reached in the traverse, beginning at the highest point in the hierarchical structure (which may be referred to as the root node). Based on the name of the node, the process will either continue processing or skip. If there is a skip and the node is not a leaf node, then the remaining nodes within the examined branch will also be skipped. In this manner, the process is not required to enter a branch that is not of interest and then back out of the branch. The branch will either be processed or skipped.

In an embodiment, traversal of a file structure is recursive, and is implemented based upon the file framework, with the traversal code or system not being required to view a folder except for the relevant name sequence. In this embodiment, the basic decision making is based only on the node names. In an embodiment, there are three main cooperating abstractions applied in the process:

(1) Traversal orchestration by a "walker" element.

(2) Node processing by a "walker handler" element, including filter handlers to provide traversal control and processing handlers to process traversal lead nodes.

(3) File classification, with a name-based, extension-based being sufficient in most cases.

In a particular embodiment of the invention, a process is applied to class files, including class files for J2EE systems (Java 2 Platform, Enterprise Edition). In an embodiment, the output of the class file system traversal is a class file stream. In particular, an embodiment utilizes Java under the JDK (Java Development Kit) 5.0, including JSR-175 recommendation regarding code annotations.

In an embodiment of the invention, events and handler invocations are utilized in implementing file system traversal. Handler codes may be provided for the action of processing or skipping the current node, and to stop processing overall or to stop processing of the current folder. In an embodiment of the invention, a library for a traversal process may include, but is not limited to:

(a) A file system walker;

(b) A classifier for typical Java files;

(c) A configurable file system search with file based conditions (using regular expressions on file names and file classifier classes) and conditions for traversal of particular nodes.

In an embodiment, the file traversal will further provide a mechanism for aborting the file traversal if needed, and for ending the traverse upon completion. On abort, the system will clean up any data issues remaining from the traversal process. On end, the system will store the data that is gained from the traversal process.

Figure 1:
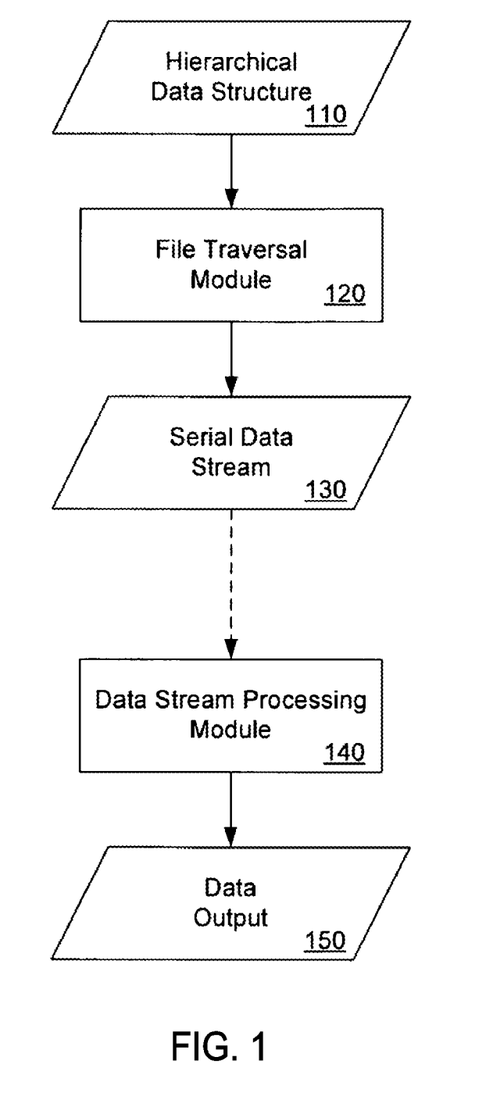
FIG. 1 is an illustration of an embodiment of a file traversal process.

FIG. 1 is an illustration of an embodiment of a file traversal process. In this illustration, a hierarchical data structure 110 is provided to a file traversal module 120. The hierarchical data structure 110 may include, but is not limited to, a Java file system. The file system may include certain elements that may be sought, including, but not limited to annotations for Java files.

In an embodiment of the invention, the file traversal module 120 walks through the data structure. Using only the names of the elements, the file traversal module 120 makes a determination whether to process or skip each element of the data structure. In an embodiment of the invention, the file traversal module processes only portions of interest, and does not process any element more than once.

In an embodiment of the invention, the file traversal module 120 then outputs a serial data stream 130 representing the elements of interest in the data structure 110. In an embodiment, the data stream 130 may be used for any purpose, including the provision of the data to a data stream processing module 140. The processing module 140 may be intended to process the data structure in a serial form to, for example, search for certain elements in the portions of interest in the data structure. The processing module 140 may then produce a data output 150 that, for example, includes information regarding elements that were found in the data structure.

Figure 2:
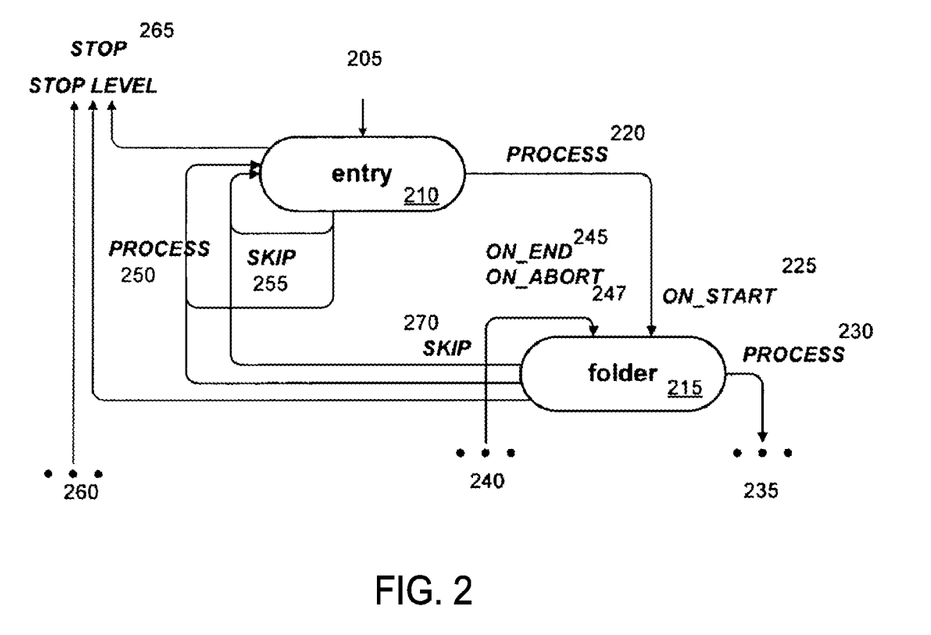
FIG. 2 is an illustration of an embodiment of process for traversal of individual file entries.

FIG. 2 is an illustration of an embodiment of process for traversal of individual file entries. FIG. 2 illustrates the process for any particular entry in a hierarchical file structure. There is a path 205 into an entry 210. Based on the name, there will either be a skip or a process. If there is a skip 255, then there are no more elements to process and there is a stop 265. If there is a process and there is no folder (i.e., the entry is a leaf node), then there is processing 250 of the entry 210. With the processing of the entry, the level is completed and there is again a stop 265.

If there is process 220 and there is a folder 215 (shown with command ON_START 225), there is then either processing or skipping. If there is a skip 270, there may be a return to the entry 210, and a stop 265. If there is processing and there are no elements in the folder 250, then there is a return to the entry 210 and a stop 265. If there is processing and there are elements in the folder 215, the processing 230 continues with the elements below 235, which may include more folders. The return 240 may be to the folder 215, and then a stop 265 when there are no more elements in the folder 215 (ON_END 245). Alternatively, there could be an abort of the traversal process of the folder (ON_ABORT 247), which again returns to the folder 215 for the stop 265. There may also be stops 265 resulting from other levels below.

Figure 3:
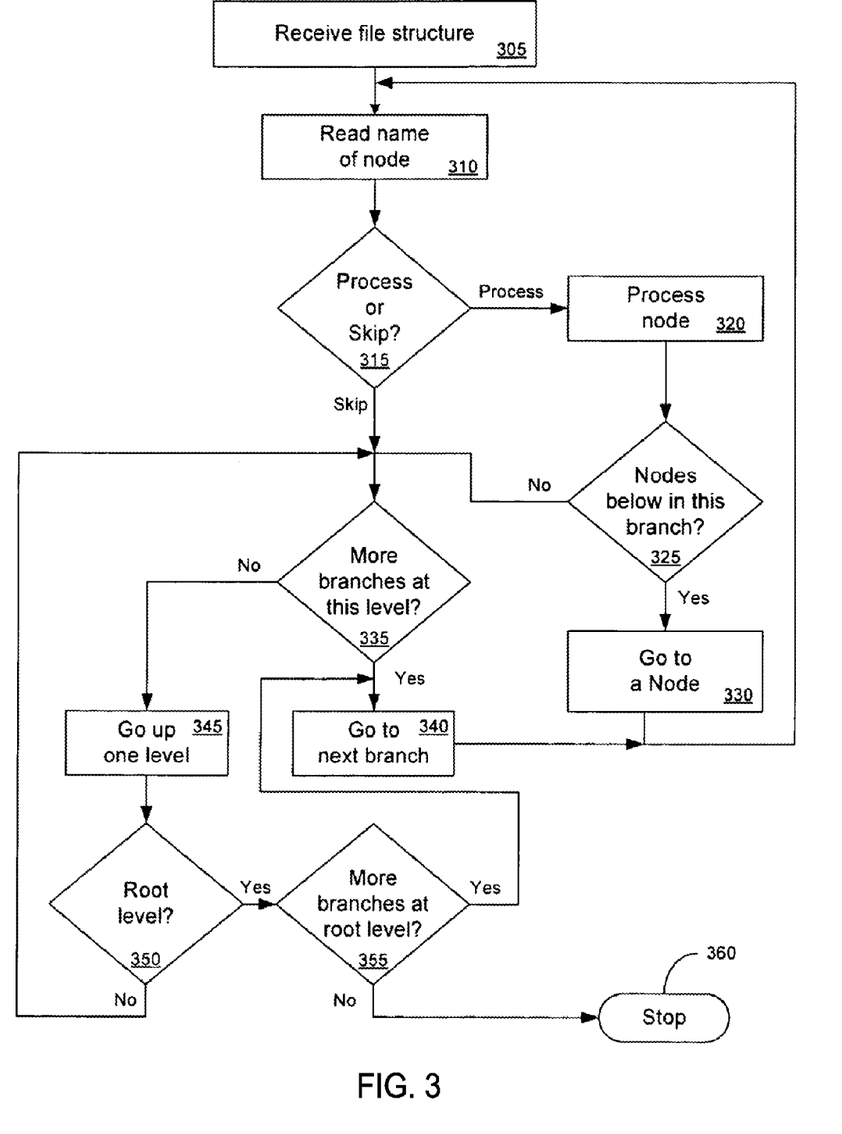
FIG. 3 is a flowchart to illustrate an embodiment of a file system transversal.

FIG. 3 is a flowchart to illustrate an embodiment of a file system traversal. In this illustration, a file structure is received 305, the file structure having any hierarchical structure. The name of the first (root) node is read 310. Based on the name of the node, there is a determination whether to process or skip the node 315, with a skip resulting in skipping the remainder of the branch. If the determination is to process, the node is processed 320. There is then a determination whether there are nodes below in this branch 325, i.e., that the node is not a leaf node. If so, then the traversal continues to one of the nodes below 330 and the process returns to reading the name of the node 310. If there are no nodes below, then there is determination whether there are more branches at the same level 335. If there is a skip determination, there is also the determination whether there are more branches at the same level 335.

If there are more branches as the same level 335, then the traversal continues to the next branch 340, and the process returns to reading the name of the node 310. If there are not any more branches at this same level, then the traversal goes up one level in the hierarchy 345. If going up one level does not return the traversal to the root level 350, then there is again the determination whether there are more branches at the same level 335. If going up one level returns the traversal to the root level 350, then there is determination whether there are more branches at the root level 355. If so, then the traversal continues to the next branch 340. If there are no more branches at the root level, then there is a stop 360 because all elements of the file structure have been addressed.

Figure 4:
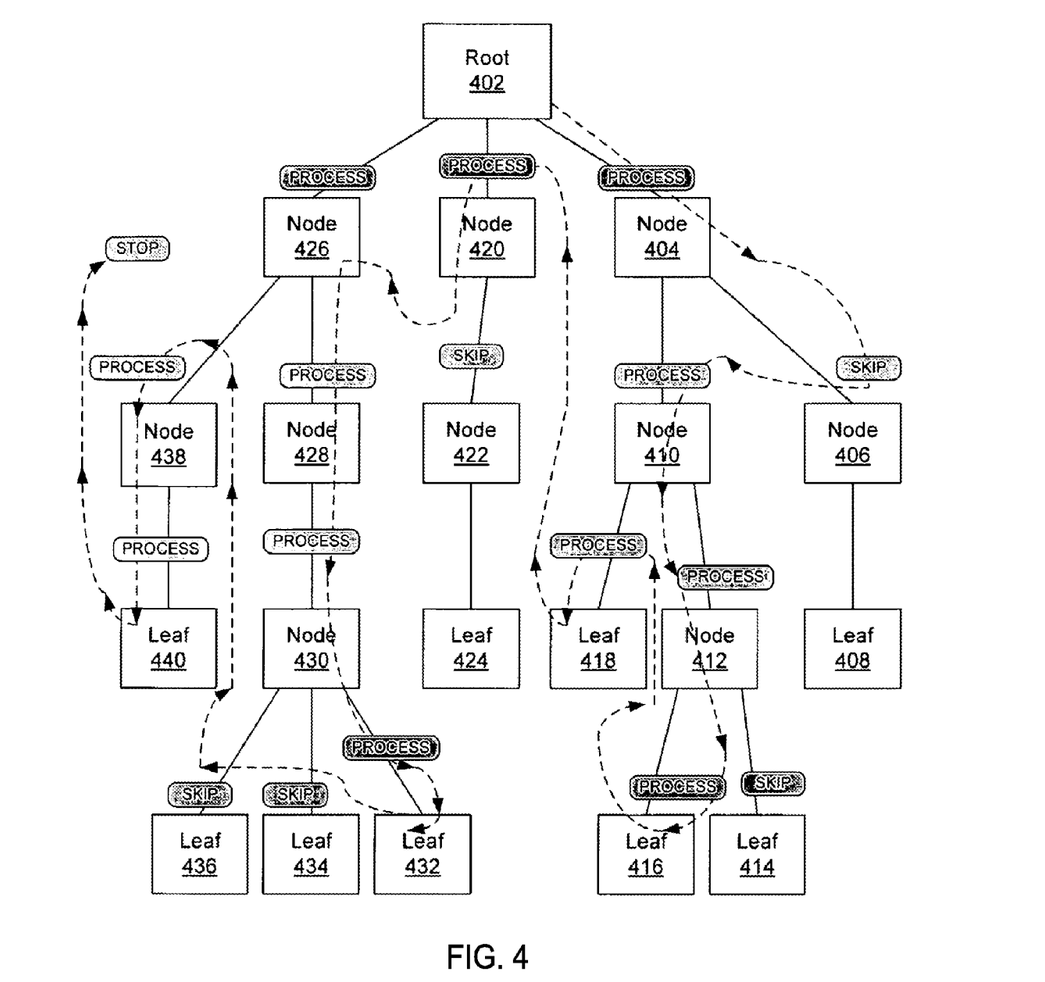
FIG. 4 is an illustration of the traversal of an exemplary hierarchical file structure using an embodiment of the invention.

FIG. 4 is an illustration of the traversal of an exemplary hierarchical file structure using an embodiment of the invention. In this illustration, the processing of a file structure includes the processing of a hierarchy that includes multiple nodes. As shown in FIG. 4, the file structure has a root node 402 (which may have a different designation. The file traversal involves a "walk" through the hierarchy, with no element of the file structure being examined more than once.

In the illustrated traversal, the process continues from root node to node 404. Based on the name of node 404, the traversal continues with processing. There are two nodes below node 404. Based on the name of node 406, node 406 is skipped, resulting in also skipping leaf node 408. The traversal continues to node 410, which is processed. Below node 410, node 412 is processed, with leaf node 414 skipped and leaf node 416 being processed. The traversal returns to leaf node 418, which is processed.

The node below the root node 402 is node 420, which is processed. Below is node 422, which is skipped and which results in skipping leaf node 424. The traversal returns to last node below root node 402, node 426, which is processed. Node 428 is processed, resulting in processing of node 430. Node 430 has three leaf nodes, with leaf node 432 being processed, and leaf nodes 434 and 436 being skipped. The process continues to node 438, with leaf node 440 being processed. The traversal returns and, with no more branches to process, the traversal ends.

Figure 5:
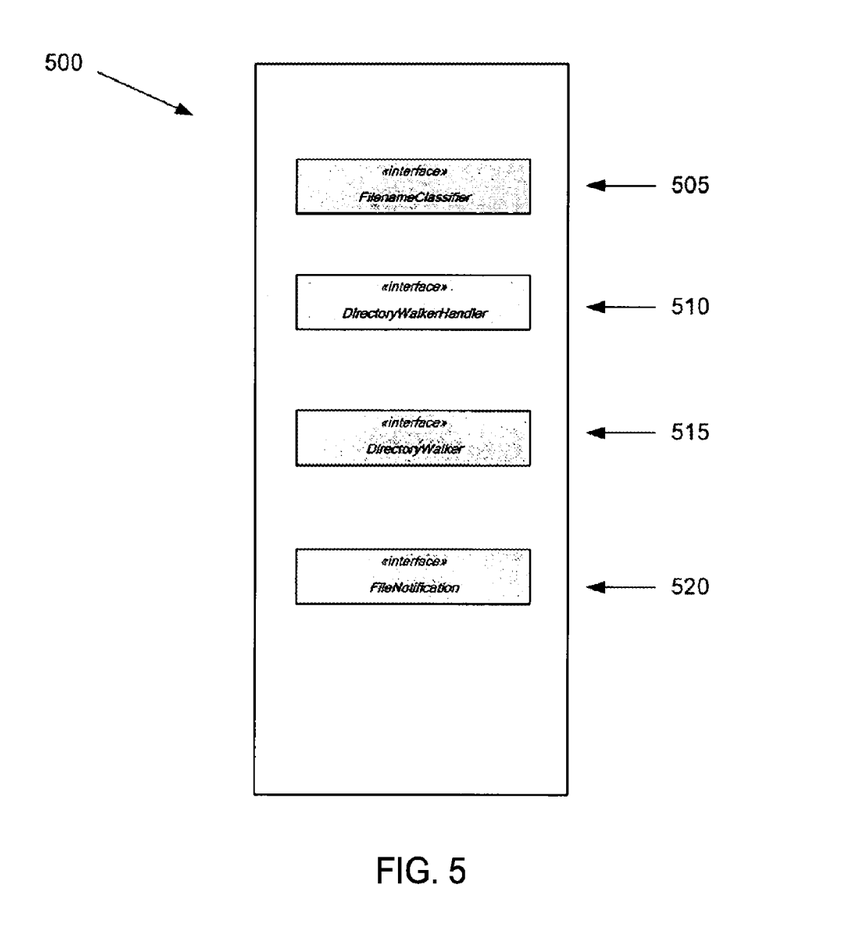
FIG. 5 is an embodiment of utilities for traversing file systems.

FIG. 5 is an embodiment of utilities for traversing file systems. In this illustration, the utilities 500 include utilities for traversing file systems and archives and for finding entries of interest. The utilities may include:

FileNameClassifier 505—Interface to provide name-based classification of files.

DirectoryWalkerHandler 510—Interface between DirectoryWalker (shown below) and a handler providing the actual behavior.

DirectoryWalker 515—Interface for tools walking over a directory tree and invoking a callback handler on each file or directory.

FileNotification 520—Interface to pass on notifications pertaining to a file object.

Figure 6:
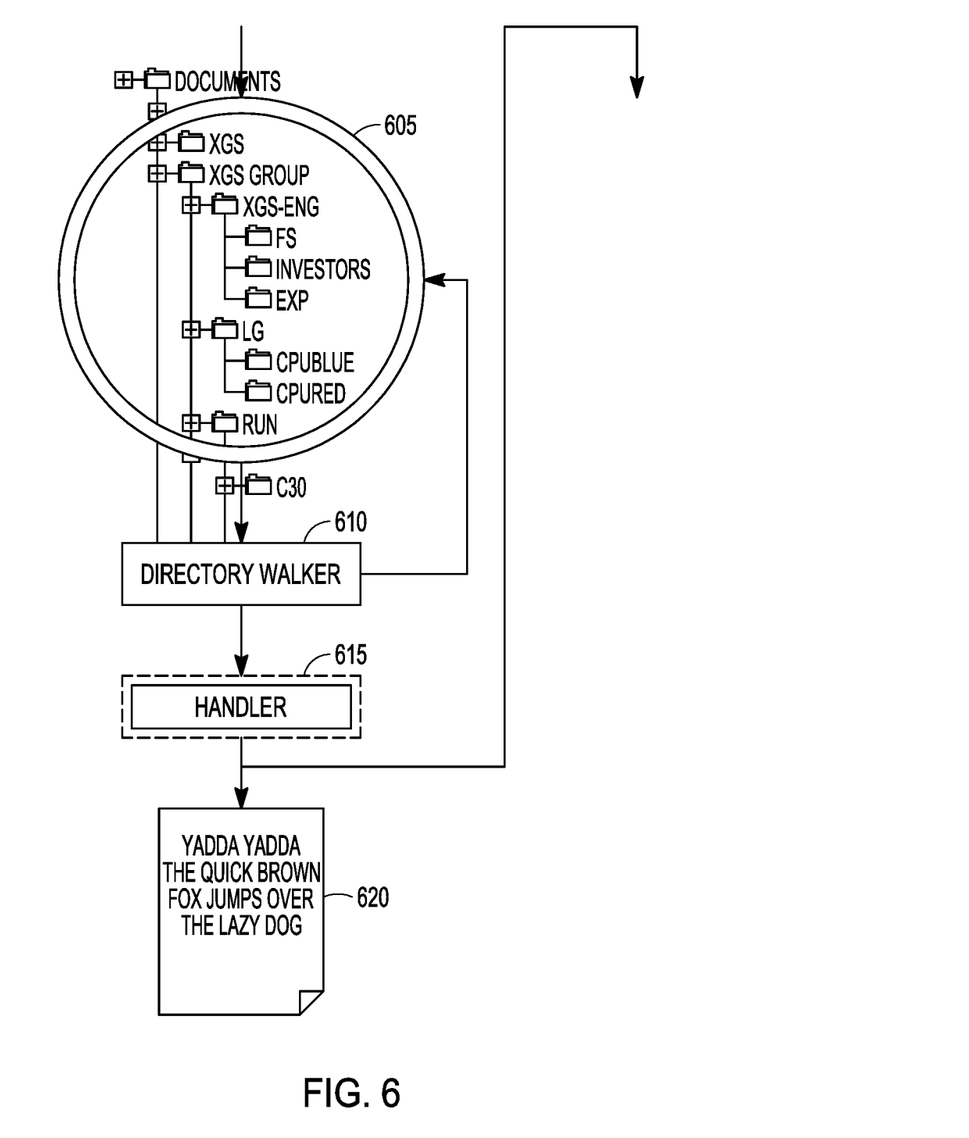
FIG. 6 is an illustration of a system for traversal of a Java class file structure.

FIG. 6 is an illustration of a system for traversal of a Java class file structure. In this particular embodiment, a Java class file 605 is received for processing, with the class file having a hierarchical file structure. In an embodiment, a directory walker module 610 provides an interface walking over the directory tree and invoking a callback handler on each file or directory. The director walker module 610 operates with a handler 615 that controls the behavior of the file traversal.

The traversal of the Java class file structure 605 results in a class file data stream 620. The class file data stream 620 may be an output in itself, or may be an input for further processing of the class files in a serial format.

Figure 7:
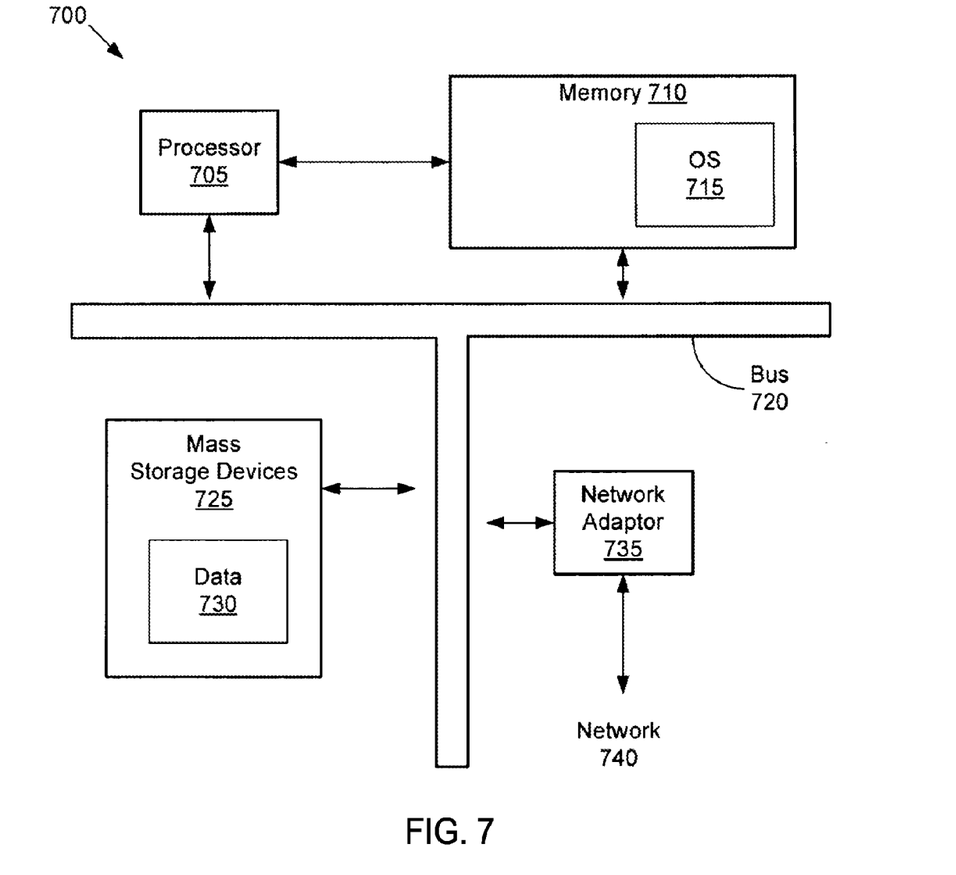
FIG. 7 is an illustration of a computer system in an embodiment of the invention.

FIG. 7 is an illustration of a computer system in an embodiment of the invention. A computer system may include a system for processing of a hierarchical file structure. The computing system illustrated in FIG. 7 is only one of various possible computing system architectures, and is a simplified illustration that does include many well-known elements. As illustrated, a computing system 700 can execute program code stored by an article of manufacture. Computer system 700 may be a J2EE system, ABAP system, or administration system. A computer system 700 includes one or more processors 705 and memory 710 coupled to a bus system 720. The bus system 720 is an abstraction that represents any one or more separate physical buses, point-to-point connections, or both connected by appropriate bridges, adapters, or controllers. The bus system 720 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 7, the processors 705 are central processing units (CPUs) of the computer system 700 and control the overall operation of the computer system 700. The processors 705 execute software stored in memory 710. A processor 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 710 is or includes the main memory of the computer system 700. Memory 710 represents any form of random access memory (RAM), read-only memory (ROM), flash memory, or the like, or a combination of such devices. Memory 710 stores, among other things, the operating system 715 of the computer system 700.

Also connected to the processors 705 through the bus system 720 are one or more internal mass storage devices 725 and a network adapter 735. Internal mass storage devices 725 may be or may include any conventional medium for storing large volumes of instructions and data 730 in a non-volatile manner, such as one or more magnetic or optical based disks. In an embodiment of the invention, the mass storage devices may include storage of a hierarchical file structure that requires processes.

The network adapter 735 provides the computer system 700 with the ability to communicate with remote devices, over a network 740 and may be, for example, an Ethernet adapter.

Figure 8:
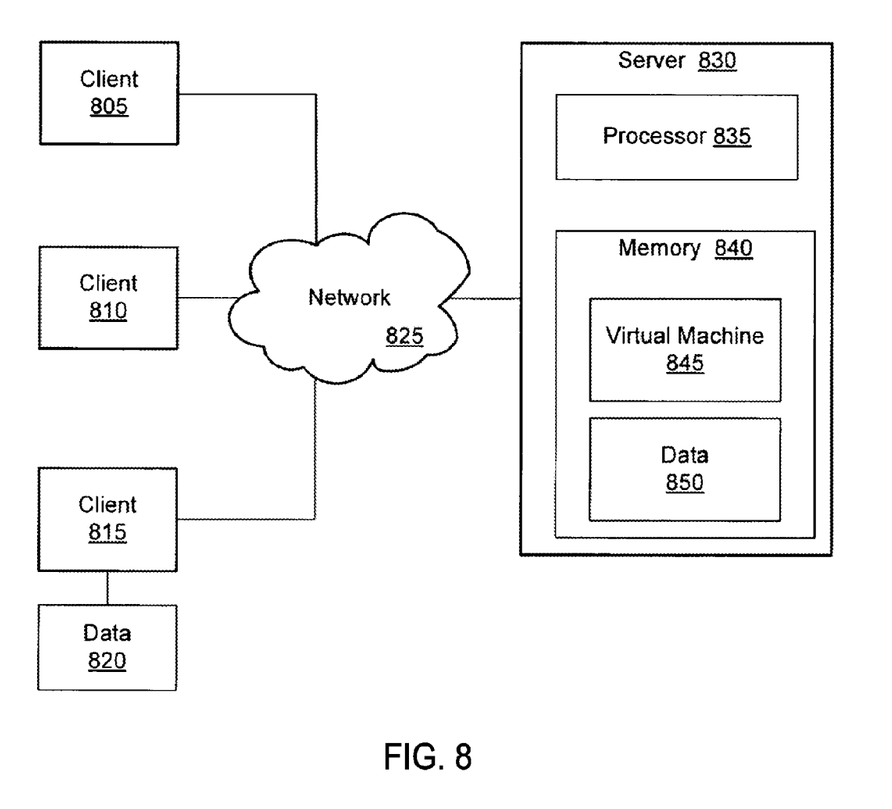
FIG. 8 illustrates an embodiment of a client-server network system.

FIG. 8 illustrates an embodiment of a client-server network system. As illustrated, a network 825 links a server 830 with client systems 805, 810, and 815. Client 815 may include certain data for processing 820, including a hierarchical data structure. Server 830 includes programming data processing system suitable for implementing apparatus, programs, and/or methods in accordance with one or more embodiments of the present invention. Server 830 includes processor 835 and memory 840. Server 830 provides a core operating environment for one or more runtime systems, including, for example, virtual machine 845, at memory 840 to process user requests. Memory 840 may include a shared memory area that is accessible by multiple operating system processes executing in server 830. For example, virtual machine 845 may include an enterprise server (e.g., a J2EE-compatible server or node, Web Application Server developed by SAP AG, WebSphere Application Server developed by IBM Corp. of Armonk, N.Y., and the like). Memory 840 can be used to store an operating system, a Transmission Control Protocol/Internet Protocol (TCP/IP) stack for communicating over network 825, and machine executable instructions executed by processor 835. The memory 845 may also include data 850 for processing, including the processing of data that includes one or more hierarchical data structures. In some embodiments, server 835 may include multiple processors, each of which can be used to execute machine executable instructions.

Client systems 805-815 may execute multiple application or application interfaces. Each instance or application or application interface may constitute a user session. Each user session may generate one or more requests to be processed by server 830. The requests may include instructions or code to be executed on a runtime system, such as virtual machine 845 on server 830.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   receiving a set of data elements in a computer, the set of data elements stored in computer memory according to a hierarchical file structure, the data elements being organized as a root node, one or more intermediate nodes, each intermediate node representing a folder with one or more nodes below the intermediate node in the same branch of the hierarchical file structure, and one or more leaf nodes, each leaf node representing a file entry;
   traversing the set of data elements in the computer memory utilizing a processor to select a plurality of data elements that are of interest, wherein traversing the set of data elements includes determining whether to skip or process each data element that is reached in the set of data elements based solely on a name of the data element, and wherein the traversal of the set of data elements includes processing each data element of the set of data elements that is reached in the traversal no more than once and processing each such data element without looking forward in the set of data elements;
   outputting a serial data stream from the computer representing the plurality of data elements of the set of data elements that are selected in the traversal of the set of data elements; and
   providing the serial data stream to a processing module to search the data stream for certain data elements.

2. The method of claim 1, wherein skipping an intermediate node includes skipping any additional data elements below the intermediate node in the same branch of the hierarchical structure.

3. The method of claim 1, wherein processing an intermediate node includes processing or skipping any data elements in the next level below the intermediate node in the same branch of the hierarchical structure.

4. The method of claim 3, wherein the traversal of the set of data elements further includes processing or skipping a branch at a first level of the file hierarchy and continuing to another branch if there is another branch at the first level to process and going to a second level above the first level if there is not another branch at the first level to process.

5. The method of claim 4, wherein, upon going to the second level, the traversal of the set of data elements includes determining if there is another branch to process at the second level.

6. The method of claim 1, where the set of data elements comprises a Java™ class file.

7. The method of claim 1, wherein the Java class file includes a plurality of annotations.

8. A file traversal computer system comprising:
   a processor for the processing of stored data;
   a memory for the storage of data, the data to include a hierarchical file structure, the file structure including a plurality of nodes, the plurality of nodes being organized as a root node, one or more intermediate nodes, each intermediate node representing a folder with one or more nodes below the intermediate node in the same branch of the hierarchical file structure, and one or more leaf nodes, each leaf node representing a file entry;
   a walker module to traverse the hierarchical file structure, wherein the walker module traverses the hierarchical file structure without processing any node more than once;
   a handler module to determine whether to process or skip each node of the file structure and to select data elements that are of interest, the handler module to determine whether to process or skip each node that is reached based only the name of the node and is to process each such node of the without looking forward to the hierarchical file structure; and
   a file classification module to classify the nodes of the file structure;
   wherein the handler module is to output a serial data stream representing a plurality of nodes that are selected in the traversal of the hierarchical file structure, the serial data stream to be provided to a processing module to search for certain data elements.

9. The computer system of claim 8, wherein classification of the nodes by the file classification module includes classification of the nodes of the hierarchical file structure based on a name of each node.

10. The computer system of claim 8, wherein if the handler module skips an intermediate node the handler module skips any nodes below the intermediate node in the same branch of the hierarchical file structure.

11. The computer system of claim 8, wherein the handler module processes an intermediate node the handler module then processes or skips any nodes in the next level below the processed intermediate node intermediate in the same branch of the hierarchical file structure.

12. The computer system of claim 8, wherein the handler module is to process or skip a branch at a first level of the hierarchical file structure and to continue to another branch if there is another branch at the first level to process, and is to go to a second level of the hierarchical file structure above the first level if there is not another branch at the first level to process.

13. The computer system of claim 12, wherein the handler module, upon going to the second level, is to determine if there is another branch to process at the second level.

14. The computer system of claim 8, wherein the hierarchical file structure comprises a Java™ class file.

15. An article of manufacture comprising:
   a non-transitory computer-readable storage medium including data that, when accessed by a processor, cause the processor to perform operations comprising:
      receiving a set of data in a computer, the set of data elements stored in computer memory according to a hierarchical file structure, the data elements being organized as a root node, one or more intermediate nodes, each intermediate nodes representing a folder with one or more nodes below the intermediate node in the same branch of the hierarchical file structure, and one or more leaf nodes, each leaf node representing a file entry;
      traversing the set of data elements in the computer memory utilizing a processor to select a plurality of data elements that are of interest, wherein traversing the set of data elements includes determining whether to skip or process each data element that is reached in the set of data elements based solely on a name of the data element, and wherein the traversal of the set of data elements includes processing each data element of the set of data elements that is reached in the traversal no more than once and processing each such data element without looking forward in the set of data elements;
      outputting a serial data stream from the computer representing the plurality of data elements of the set of data elements that are selected in the traversal of the set of data elements; and
      providing the serial data stream to a processing module to search the data stream for certain data elements.

16. The article of manufacture of claim 15, wherein skipping an intermediate node includes skipping any additional data elements below the intermediate node in the same branch of the hierarchical structure.

17. The article of manufacture of claim 15, wherein processing an intermediate node includes processing or skipping any data elements in the next level below the intermediate node in the same branch of the hierarchical structure.

18. The article of manufacture of claim 17, wherein the traversal of the set of data further includes processing or skipping a branch at a first level of the file hierarchy and continuing to another branch if there is another branch at the first level to process and going to a second level above the first level if there is not another branch at the first level to process.

19. The article of manufacture of claim 18, wherein, upon going to the second level, the traversal of the set of data elements includes determining if there another branch to process at the second level.

20. The article of manufacture of claim 15, where the set of data elements comprises a Java™ class file.

21. The article of manufacture of claim 20, wherein the Java class file includes a plurality of annotations.

* * * * *